United States Patent [19]

Koo

[11] Patent Number: 4,583,196

[45] Date of Patent: Apr. 15, 1986

[54] SECURE READ ONLY MEMORY

[75] Inventor: James T. Koo, Los Altos Hills, Calif.

[73] Assignee: Honeywell Inc., Minneapolis, Minn.

[21] Appl. No.: 546,691

[22] Filed: Oct. 28, 1983

[51] Int. Cl.$^4$ ............................................. G06F 12/14
[52] U.S. Cl. ................................................... 364/900
[58] Field of Search ... 364/200 MS File, 900 MS File; 365/94

[56] References Cited

U.S. PATENT DOCUMENTS

| 4,384,326 | 5/1983 | Devchoudhury | 364/200 |
| 4,513,389 | 4/1985 | Devchoudhury | 364/900 |
| 4,519,036 | 5/1985 | Green | 364/200 |

Primary Examiner—Raulfe B. Zache
Attorney, Agent, or Firm—Stephen W. Buckingham

[57] ABSTRACT

A secure read only memory (SROM), i.e. a ROM which may be used in program execution but which prevents easy copying of code embodied therein, is described.

61 Claims, 8 Drawing Figures

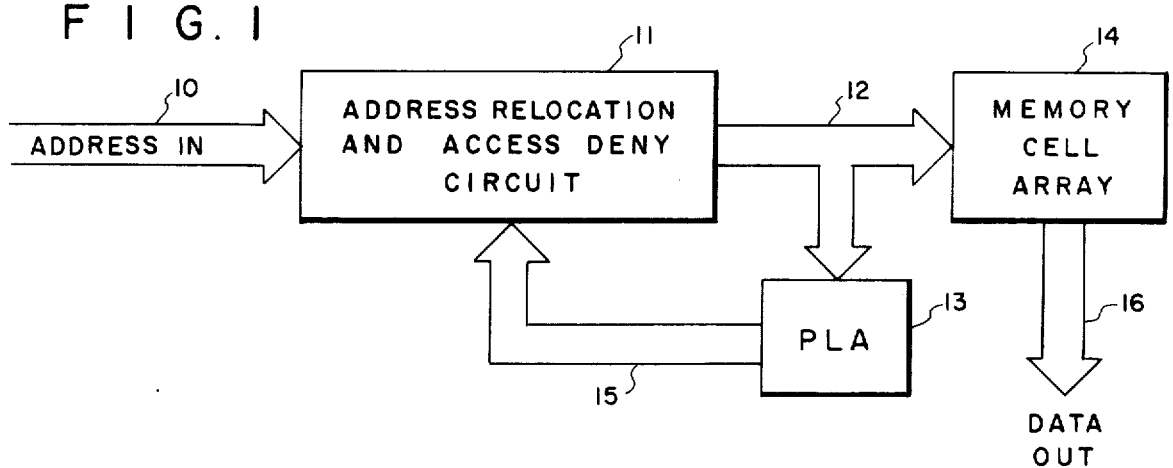
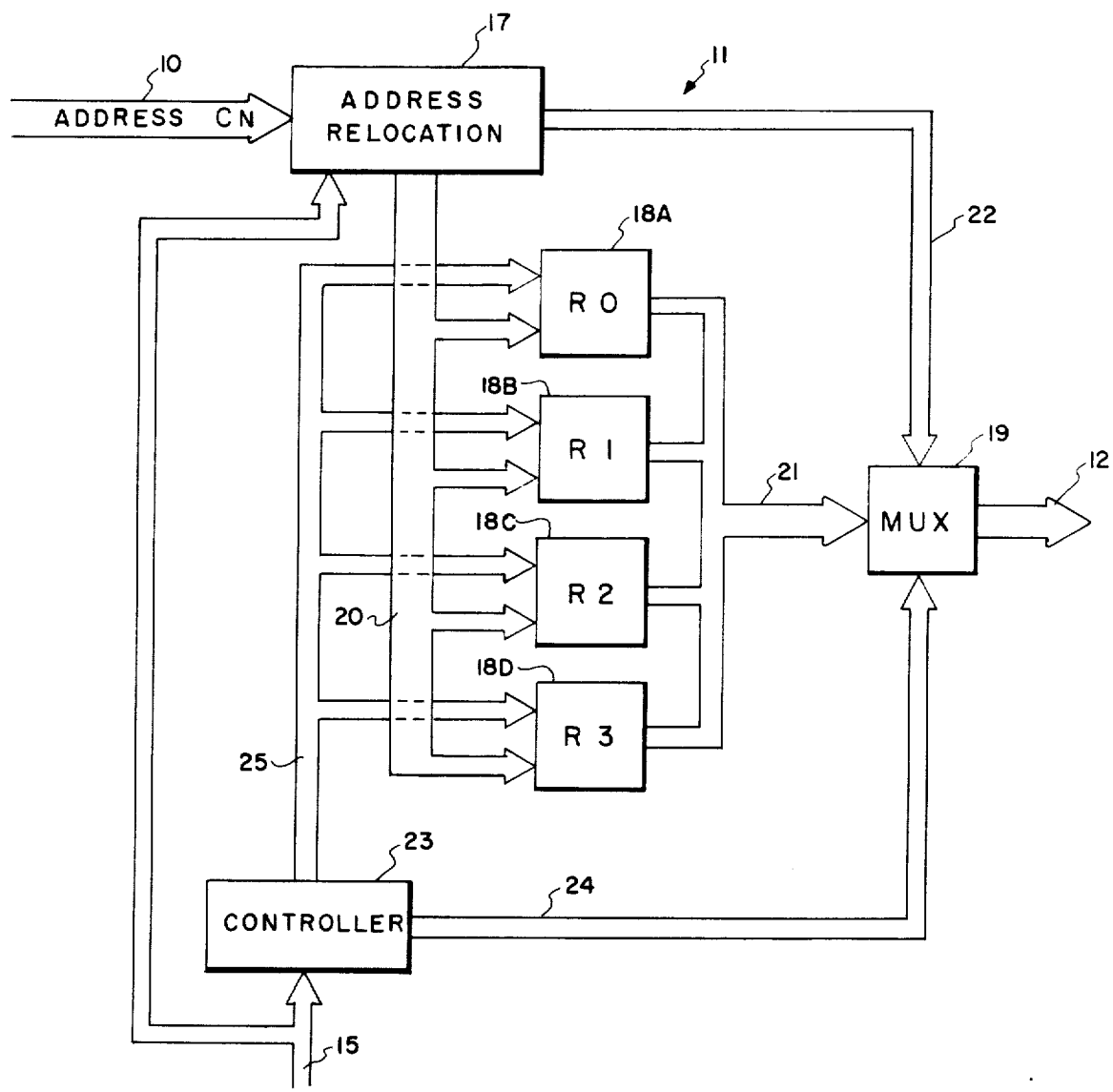

SECURE READ ONLY MEMORY

The present invention relates to systems for preventing unauthorized copying or reading of computer software stored in read only memory.

BACKGROUND OF THE INVENTION

One form in which computer software is often supplied to users is with the code embodied in read only memory (ROM). The use of ROM based software has become particularly common in the areas of video games and personal computers. ROM based software for these systems includes both system software, for which the ROM is typically a permanent portion of the circuit, and application software, for which the ROM is typically provided as a part of a plug-in module.

A difficulty with the use of ROM based software lies in the ease with which the contents of a typical ROM may be read. Once the contents of the ROM have been obtained the software may be easily copied.

Various schemes to prevent such copying have been proposed. One alternative is to encrypt memory address signals and data signals transmitted between the ROM and the central processor. One disadvantage of this approach is that a person with a knowledge of the encryption circuitry could defeat the encryption scheme and copy the software. Also, unless the encryption and decryption is performed within the microprocessor itself, the decrypted code may be obtained at the processor inputs. A third disadvantage is that because the central processor must encrypt and decrypt data, units manufactured prior to the inclusion of the encryption scheme would require retrofitting to be compatible with such ROMs.

A second approach is to monitor program flow and generate address signals within the ROM itself. In this way attempts to read information in the ROM without executing the program itself are detected and only valid program execution paths are allowed. A system providing such monitoring is described in U.S. Pat. No. 4,377,844 issued to Marc Kaufman on Mar. 22, 1983. This system requires a complicated arrangement of counters and address generation circuitry. The complexity of the circuit involved makes it impractical for use in an inexpensive ROM based software package. Furthermore the system described in this patent allows execution of code only in predefined blocks. Many software packages include provision for interrupts which will cause program execution to be suspended temporarily while specific functions are performed. Because these interrupts could occur while a predefined block is being executed the compatability of such a ROM with an interrupt system is unclear.

BRIEF DESCRIPTION OF THE DRAWINGS

FIG. 1 is a block diagram of a preferred embodiment of the invention;

FIG. 2 is a block diagram of a preferred embodiment of the address relocation and access deny circuit of the invention;

SUMMARY OF THE INVENTION

Figure 3:
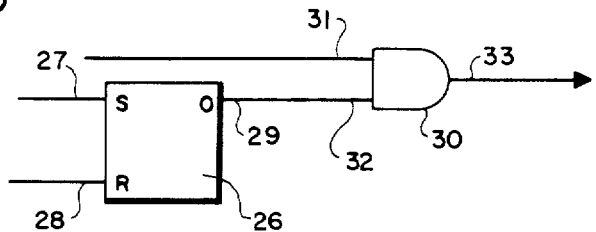
FIG. 3 is a circuit diagram of a portion of the sequence detector of the invention.

The present invention provides a secure read only memory (SROM), i.e. a ROM which may be used in program execution, but which prevents easy unauthorized reading or copying of code embodied therein.

According to one aspect of the invention program flow is monitored and if an unacceptable sequence is detected further correct access to the ROM is denied.

According to a second aspect of the invention an address relocation scheme is used to prevent a potential copier from monitoring program flow in actual use and thus obtaining the code stored in the ROM.

DETAILED DESCRIPTION OF THE PREFERRED EMBODIMENT

In the description which follows certain assumptions regarding the central processor with which the SROM is to be used and the SROM itself will be made. For example the central processor will be assumed to provide a thirteen bit address signal to the SROM. The SROM itself will be assumed to store 64 Kbits organized as 8 Kbytes. Other assumptions about the system will be noted in the description. These assumptions are for purposes of simplifying the explanation and should not be considered to limit the scope of the invention. Furthermore in the description below the term memory cell will refer to a unit of memory capable of storing a single bit. The term memory location will refer to the smallest group of memory cells which may be accessed at one time, typically an eight bit byte.

One method which a potential copier of ROM based software might use to obtain a listing of that software is to sequentially step through all memory locations in the ROM, interrogating each one and recording the contents as returned by the ROM. Such a procedure will not, in general, follow the sequence in which ROM locations would be interrogated during program execution. This follows from the fact that almost any practical program will include branching commands which cause the instructions of the program to be executed in some order other than that in which they are stored. Therefore under one aspect of the present invention the order in which memory locations are accessed is monitored. When a sequence which could not result from normal program execution is detected an address relocation and access deny circuit is activated, preventing the potential copier from obtaining further valid information from some or all of the memory locations of the SROM.

A second method which a potential copier may use to obtain the contents of a ROM avoids the security feature described above by operating during actual program execution. Each time the central processor accesses a memory location, that location and the contents as returned by the ROM are recorded. After the program has been run a number of times using different options offered therein, a listing of subtantially all of the contents of the ROM may be obtained. A second aspect of the present invention prevents copying in this manner by intentionally using an address relocation scheme.

Under such a scheme the address transmitted by the central processor does not necessarily correspond to the actual physical address of the data desired. Two different address signals transmitted by the central processor to the ROM may actually access the same memory location. Furthermore the same address transmitted at two different times during program execution may access two different memory locations. As a result the potential copier does not obtain a listing of the memory contents correctly associated with their memory locations. Hence the program may not be copied.

Furthermore the address relocation scheme may be used to allow the SROM to contain a number of memory locations which differs from $2^n$, where n is the number of address bits received from the central processor. In this way the potential copier is prevented from knowing even how many memory locations the SROM includes. Thus a potential copier will not know whether a listing obtained is complete.

Those skilled in the art will perceive that either of the two aspects of the invention described above could be implemented separately. While this is true maximum security results from using the two aspects together.

FIG. 1 shows a block diagram of a preferred embodiment of the circuit of the invention. In operation a signal is transmitted by the central processor, not shown, and arrives on the address bus, 10. The signal on the address bus enters the address relocation and access deny circuit, 11, hereinafter circuit 11, which alters the signal according to the current state of the address relocation portion of circuit 11, if that state calls for any such alteration. The signal, as altered, represents the actual address of the memory location in memory cell array 14 to be accessed. The signal is then passed to internal address bus 12.

Internal address bus 12 conducts the actual address signal to memory cell array 14, which transmits the data stored in the accessed memory location to the central processor on data bus 16. Internal address bus 12 is also electrically connected to programmable logic array (PLA) 13 which performs several functions in the invention. Among these functions PLA 13 provides signals which permit the system to determine whether the accessed address forms a part of an unacceptable address sequence, i.e. one which could not arise during normal program execution. If an unacceptable address sequence is detected circuit 11 is invoked and some or all subsequent attempts to access data stored in memory cell array 14 and will result in either incorrect or no data being returned to the central processor.

Turning now to FIG. 2 one embodiment of address relocation and access deny circuit 11 of FIG. 1 is shown. Circuit 11, as shown in FIG. 2, includes address relocation circuit, 17, four three bit storage registers, 18A, 18B, 18C, and 18D, a multiplexer, 19, and a controller, 23. The fact that four storage registers are used and that each is capable of storing three bits are arbitrary design choices. A different number of registers or a different storage capacity for each could be provided with no departure from the invention. Registers 18A through 18D are, in general, read/write memory.

In operation address relocation circuit 17 receives a signal on address bus 10. Address relocation circuit 17 may either alter that signal or pass it through unaltered. Whether any alteration occurs, and the nature of that alteration if it does occur, will be determined by the way address relocation circuit 17 has been programmed during prior operation.

The actual address is passed from address relocation circuit 17 to bus 22, which transmits the signal to multiplexer 19. If the access deny function of circuit 11 has not been invoked, multiplexer 19 transmits the actual address signal as received on internal address bus 12. As described previously the actual address signal is then transmitted to memory cell array 14 and PLA 13 of FIG. 1.

PLA 13 transmits a number of signals to circuit 11. The value of each of these signals will be determined by the value of the actual address signal as received by PLA 13. Among the signals transmitted by PLA 13 to circuit 11 on bus 15 is a signal which indicates whether address relocation circuit 17 is to be reprogrammed. This signal is transmitted to address relocation circuit 17 on bus 15. If a change in the programming of address relocation circuit 17 is indicated, that change is performed.

PLA 13 also transmits signals which cause the values stored in registers 18A through 18D to be altered. These signals are generated when certain preselected bits of the actual address signal take on predetermined values. The number of preselected bits can be as great as eight of the thirteen bits of the address signal. Of the remaining five bits, two are used to specify which register of registers 18A through 18D is to have a value stored therein, and the remaining three represent the value to be stored in the selected register. A signal indicative whether such a change is to be made is transmitted to controller 23 on bus 15. Controller 23 then transmits a signal to registers 18A through 18D on bus 25, in order that the specified change may be made. The proper register is selected and the value to be stored therein specified by signals transmitted to registers 18A through D from address relocation circuit 17 on bus 20.

Furthermore PLA 13 generates signals from which unacceptable sequences of memory location accesses may be detected. In different embodiments different methods may be used to detect unacceptable sequences. In one embodiment signals from PLA 13 directly indicate that memory locations have been accessed in an unacceptable sequence. In other embodiments PLA 13 generates signals from which an unacceptable sequence may be deduced by controller 23.

After an unacceptable sequence is detected controller 23 refuses to execute further instructions to alter the contents of any of registers 18A through 18D. Therefore the contents of registers 18A through 18D are locked at the time an unacceptable sequence is identified. Furthermore controller 23 transmits a signal to multiplexer 19 via bus 24. Upon receipt of such a signal multiplexer 19 no longer passes signals received on bus 22 unchanged to bus 12. Instead the two most significant bits of the actual address signal are used to select one of registers 18A through 18D, and the value stored in the selected register is transmitted to multiplexer 19 via bus 21. Multiplexer 19 discards three of the bits of the actual address signal received on bus 22 and replaces them with the three bits received from the selected register of registers 18A through 18D. Preferably the three bits supplied by the selected register form the three most significant bits of the thirteen bit address signal. This thirteen bit signal is then transmitted to memory cell array 14 on internal address bus 12. Because three bits can take on any of eight values, all of which are required to access all memory locations in memory cell array 14, the four values stored in registers 18A through 18D will allow access to, at most, half of the memory locations of memory cell array 14. If any redundancy exists among the values stored in registers 18A through 18D less than half of the memory locations of memory cell array 14 will be accessible without reprogramming registers 18A through 18D. In this way the potential copier is prevented from obtaining the entire code stored in memory cell array 14. Furthermore the addresses accessed will be altered both by address relocation circuit 17 and by the replacement of three of the bits by values stored in registers 18A through 18D. Therefore the potential copier will not only be denied access to a portion of the memory locations of memory cell array 14, but will be unable to determine which memory locations are being accessed.

As explained previously unacceptable sequences may be detected in various manners. In the preferred embodiment unacceptable sequences are detected by choosing certain memory locations in memory cell array 14 which would never be accessed in normal program execution. Typically a memory location used in this manner would be one which immediately follows one containing an unconditional branching instruction. The unconditional branching instruction will always cause the program execution to shift to a particular predetermined address in memory cell array 14. The memory address immediately following an unconditional branching instruction can only be reached during normal program execution by another branching instruction directing program flow to that location. If no branching instruction to shift program flow to the address immediately following an unconditional branching statement is provided, that memory address will not be accessed during normal program execution. Therefore, an attempt to access a memory address thus reserved is indicative of an unacceptable sequence. Preferably several memory locations are reserved in this manner and the addresses of each are programmed into PLA 13. Each memory address which is accessed is transmitted to PLA 13 on internal address bus 12. If PLA 13 detects an attempt to access a reserved memory location a signal indicative of the fact that an unacceptable sequence has occurred is transmitted to circuit 11 on bus 15 and circuit 11 is activated.

In a second embodiment PLA 13 of FIG. 1 is programmed to detect the addresses of unconditional branching instructions and the addresses of memory locations to which unconditional branching instructions shift program flow. When a memory location completing an unconditional branching instruction is accessed, a signal indicative thereof is transmitted to circuit 11 via bus 15. If the next address accessed is the destination of an unconditional branching instruction PLA 13 transmits a signal indicative thereof to circuit 11 via bus 15. If a signal indicative of a branching instruction is received by circuit 11 and the next memory access causes a signal indicative of a branching destination to be transmitted, program execution will continue normally. If no branching destination signal is received by circuit 11 following a branching instruction signal, circuit 11 is invoked.

In a generalization of the method of detecting unacceptable sequences described above, PLA 13 includes a circuit similar to that shown in FIG. 3. The circuit of FIG. 3 includes a flip-flop, 26, having inputs 27 and 28 and an output 29 and an AND gate 30, having inputs 31 and 32 and an output 33. An unacceptable sequence is indicated by a high logic level on output 33 of AND gate 30. Inputs 27 and 28 of flip-flop 26 and input 31 of AND gate 32 receive signals generated within PLA 13. Input 32 of AND gate 30 receives a signal from output 29 of flip-flop 26. A high logic level signal on input 27 of flip-flop 26 will "set" the flip-flop or bring its output to a high logic level. A high logic level signal on input 28 of flip-flop 26 will "reset" flip-flop 26 or return its output to a low logic level. Flip-flop 26 will latch in either of these states so that its output will remain the same until changed by an appropriate input signal.

In operation the output signal from flip-flop 26 is assumed to be initially at the low logic level. When PLA 13 of FIG. 1 detects a first predetermined memory location address, a high logic level signal is transmitted to controller 23 of FIG. 2 via bus 15. The signal line of bus 15 which carries this signal is connected to input 27 of flip-flop 26. As a result the output signal from flip-flop 26 goes to the high logic level. Preferably the first preselected memory address occurs prior to an unconditional branching instruction. A second predetermined memory location address will cause PLA 13 to transmit a high logic level signal on bus 15 to input 28 of flip-flop 26, causing flip-flop 26 to reset to its low logic level. Preferably the second predetermined memory location is in the block of memory locations which form the destination of the unconditional branching instruction mentioned above. A third predetermined memory location address will cause PLA 13 to transmit a signal on bus 15 which will cause a high logic level signal to be applied to input 31 of AND gate 30. Preferably the third predetermined memory location address is slightly after the unconditional branching instruction mentioned above. Therefore, shortly before the unconditional branching statement is encountered the signal to input 32 of AND gate 30 goes to a high logic level. If program flow is transferred to the code to which the unconditional branching statement directs it, flip-flop 26 will be reset and the signal provided to input 32 of AND gate 30 will return to the low logic level before the program flow returns to the memory locations immediately following the unconditional branching instruction and the third predetermined memory location is encountered. In this way at least one of inputs 31 and 32 of AND gate 30 is always at the low logic level and output 33 remains at the low logic level. If, however, the unconditional branching statement is not executed, the second predetermined memory location will not be encountered between the first and third predetermined memory locations. As a result both inputs to AND gate 30 will receive a high logic level signal, causing the output signal of AND gate 30 to go high indicating an unacceptable sequence, and invoking circuit 11 of FIG. 1.

Figure 4:
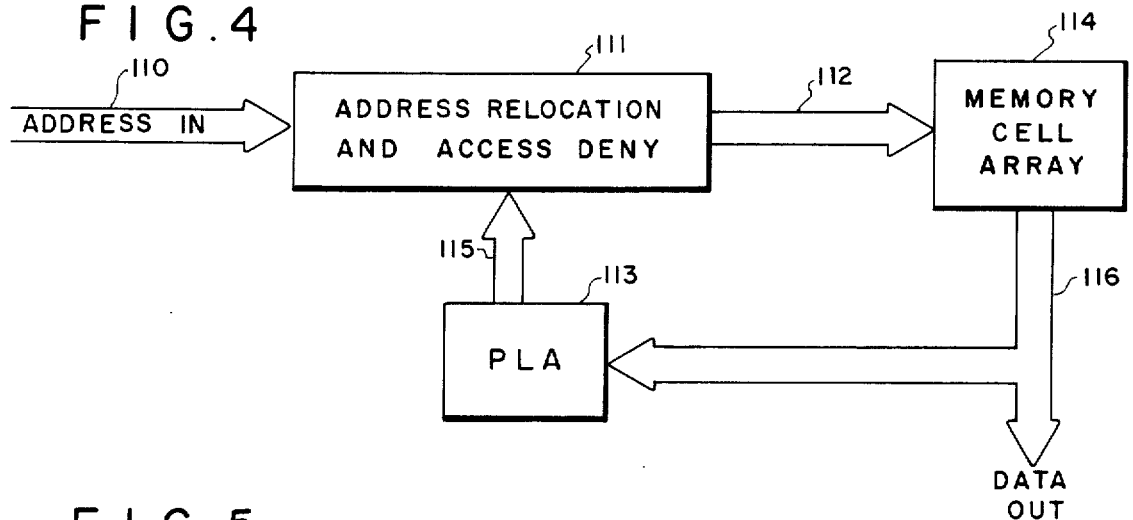
FIG. 4 is a block diagram of a first alternative embodiment of the invention.

FIG. 4 illustrates an embodiment of the invention which differs only slightly from the previously described embodiment. In the embodiment of FIG. 4 unacceptable sequences are detected in a manner quite similar to that just described, but PLA 113 monitors the data output from memory cell array 114 rather than the memory location addresses as in the embodiment of FIG. 1. A first predetermined data value will cause flip-flop 26 of FIGS. 3 to be set, a second will cause it to be reset, and a third will cause a high logic level to be applied to input 31 of AND gate 30. Data values are chosen such that the second predetermined data value will only be encountered if an unconditional branching instruction is executed between the times when the first and third predetermined data values are encountered.

Figure 5:
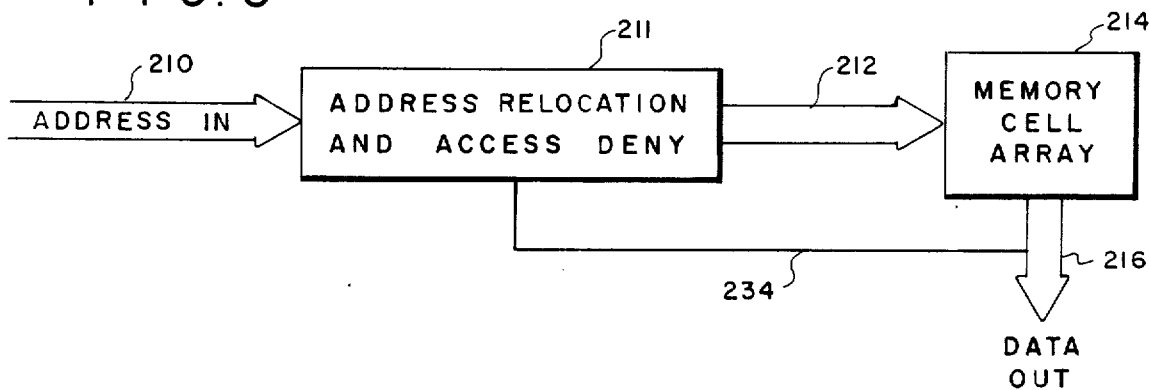
FIG. 5 is a block diagram of a second alternative embodiment of the invention.

Another method of detecting unacceptable sequences is shown in FIG. 5. In the circuit of FIG. 5 each byte of memory in memory cell array 214 has associated therewith an additional bit or ninth bit. If a particular byte contains the last portion of an unconditional branching instruction or is a branching destination then the extra bit associated with that byte will have a value of one. All other bytes of memory cell array 214 will have a value of zero stored in the additional memory cell associated therewith. The value stored in the additional memory cell of the memory location is transmitted to circuit 211 via signal line 234. During normal program execution circuit 211 will receive a series of "zeros" on signal line 234. When a value of one is received on signal line 234, the immediately following signal on signal line 234 must also have a value of one to prevent invocation of the access deny function of circuit 211. Thus, the embodiment of FIG. 5 operates in a manner quite similar to that of FIG. 4, but avoids problems which may arise if similar data is stored in various portions of the ROM.

In the above described preferred embodiment of the access deny portion of the invention the use of values stored in registers 18A through 18D limits access to only portions of memory cell array 14 of FIG. 1. Other methods may be used to prevent the potential copier from obtaining valid data. In one embodiment all access to memory cell array 14 is prevented after an unacceptable sequence has been identified. This is not a preferred approach, however, because the sudden refusal of the SROM to provide data in response to interrogation will indicate the exact point at which the unacceptable sequence was identified. This information may help a potential copier to defeat the security of the SROM. Preferably data is returned in response to memory accesses, but valid data is denied for at least some of those access attempts.

Figure 6:
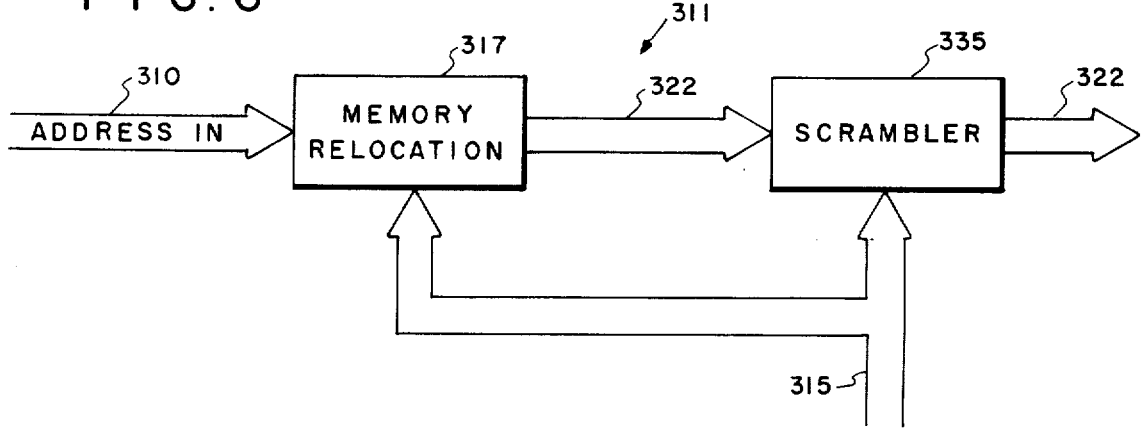
FIG. 6 is a block diagram of an alternative embodiment of the memory relocation and access deny circuit of the invention.

An alternative embodiment of circuit 11 of FIG. 1 is shown in FIG. 6 and is identified generally as address relocation and access deny circuit 311. In the embodiment of FIG. 6 memory relocation circuit 317 functions analogously to its counterpart in FIG. 2. PLA 13 of FIG. 1 transmits signals on bus 315 to alter the programming of address relocation circuit 317. The output of address relocation circuit 317 is passed to scrambler 335 via bus 322. Under normal operation scrambler 335 passes signals received from address relocation circuit 317 to internal address bus 312 unchanged. If, however, PLA 13 of FIG. 1 provides signals which indicate an unacceptable sequence, scrambler 335 will begin altering or scrambling signals before transmitting the scrambled signals to memory cell array 14 of FIG. 1 on internal address bus 312. Memory cell array 14 will then transmit the contents of the memory location corresponding to the scrambled signal on data bus 16. In this way apparently valid output results, but the potential copier will be unable to obtain a usable listing of the code stored in memory cell array 14 because of the scrambling of the addresses.

Figure 7:
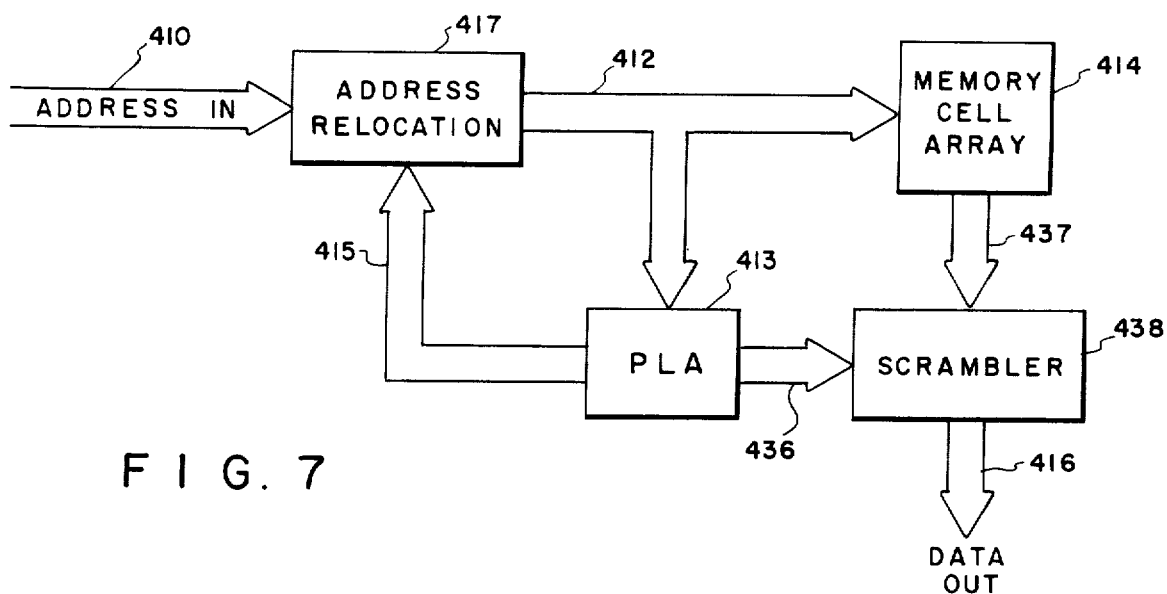
FIG. 7 is a block diagram of a third alternative embodiment of the invention.

FIG. 7 shows another alternative embodiment of the invention. In the embodiment of FIG. 7 memory relocation circuit 417 provides the actual address signals which it generates directly to internal address bus 412 for transmission to PLA 413 and memory cell array 414. PLA 413 provides signals to address relocation circuit 417 on bus 415. The signals, as in other embodiments, cause address relocation circuit 417 to be reprogrammed at appropriate times. PLA 413 transmits signals to scrambler 438 on bus 436. Those signals may be any of the signals described above from which unacceptable sequences may be detected. Scrambler 438 includes whatever logic circuitry is necessary to detect unacceptable sequences depending, of course, on which of the above embodiments of unacceptable sequence detection is chosen. Under normal operation scrambler 438 receives data output signals from memory cell array 414 on bus 437 and transfers them unchanged to data output bus 416. If an unacceptable sequence is detected, scrambler 437 thereafter alters or scrambles signals received from memory cell array 414 prior to passing those scrambled signals to data output bus 416. Therefore the potential copier does not obtain an accurate listing of the contents of memory cell array 414.

Figure 8:
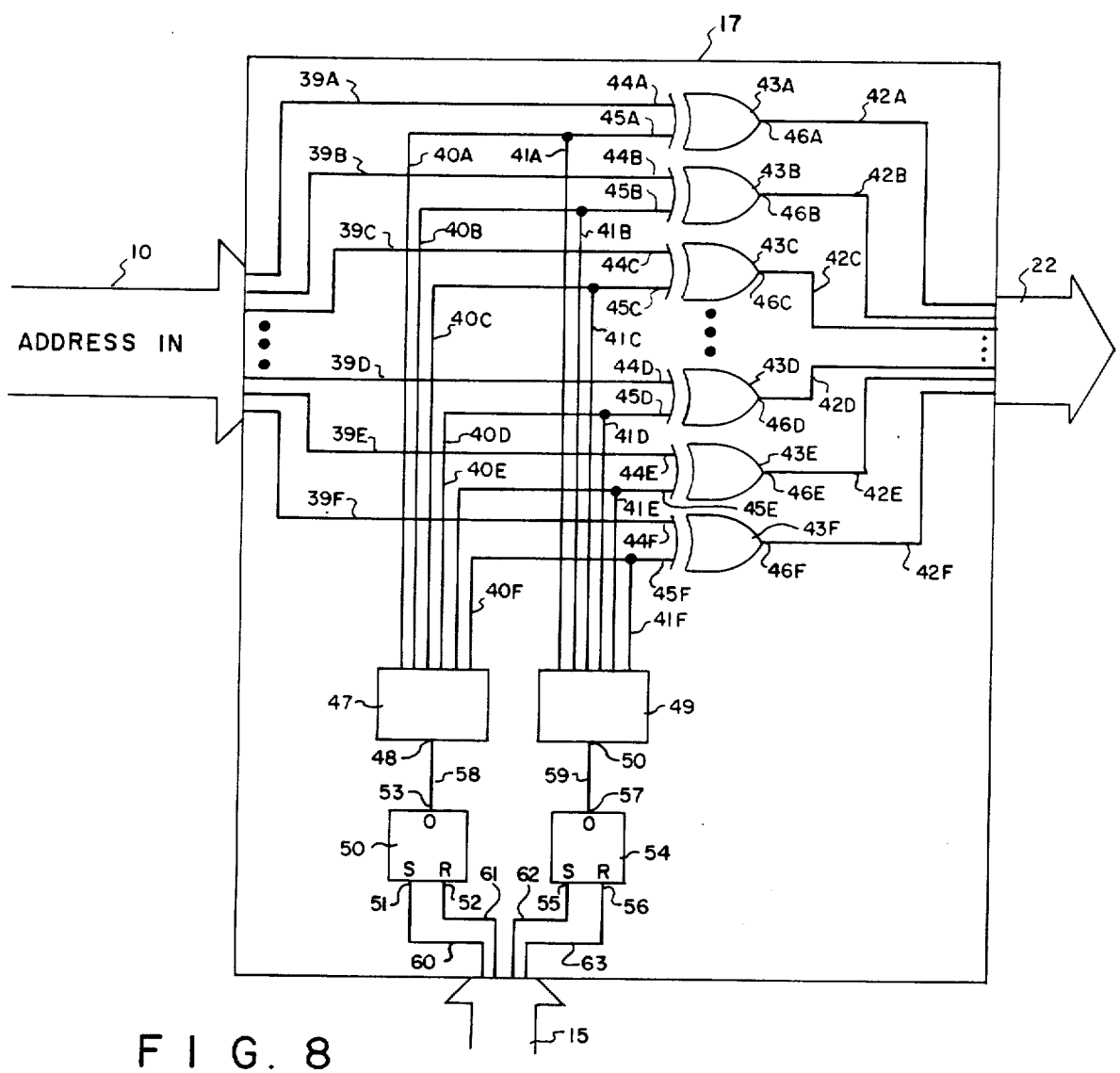
FIG. 8 is a circuit diagram of the address relocation portion of the invention.

The above description explains various embodiments of the access deny portion of the invention. As explained previously, the invention also includes a programmable address relocation circuit. FIG. 8 illustrates a preferred embodiment of address relocation circuit 17 of FIG. 2. As shown in FIG. 8 address relocation circuit 17 includes signal lines 39A through F, 40A through F, and 42A through F. Also included are EXCLUSIVE OR gates 43A through F, coupling means 47 and 49, flip-flops 50 and 54, and signal lines 58, 59, 60, 61, 62, and 63. Although only six of each of signal lines 39A through F, 40A through F, 41A through F, 42A through F, and EXCLUSIVE OR gates 43A through F are shown, the preferred embodiment includes thirteen of each of these. The reason for including thirteen of these is that one of each corresponds to one bit of the thirteen bit incoming address signal.

In operation an address signal enters address relocation circuit 17 on address bus 10. Each bit of the thirteen bit incoming address signal is provided to one of the signal lines such as signal lines 39A through F. The signal path for each of the thirteen bits is equivalent. Therefore only the signal path including signal lines 39A and 42A and EXCLUSIVE OR gate 43A will be described with the understanding that a similar description applies to the other signal paths.

The signal conducted by signal line 39A is applied to input 44A of EXCLUSIVE OR gate 43A. If EXCLUSIVE OR gate 43A is receiving a signal at the system low voltage level at input 45A then EXCLUSIVE OR gate 43A will provide a signal equivalent to the input signal from signal line 39A, at output 46A. This means that a system low voltage level signal on signal line 39A will produce a system low voltage level signal on output 46A of EXCLUSIVE OR gate 43A. If EXCLUSIVE OR gate 43A is receiving a system high voltage level signal at input 45A the signal produced at output 46A of EXCLUSIVE OR gate 43A will be inverted from that on signal line 39A. The signal emerging from EXCLUSIVE OR gate 43A is transmitted on signal line 42A to bus 22 where it is combined with signals transmitted on signal lines 42B through F to form the thirteen bit actual address signal described above.

The signals provided to inputs 45A through F of EXCLUSIVE OR gates 43A through F respectively are determined by the output signals from connecting means 47 and 49, which signals are determined, in turn, by signals transmitted to connecting means 47 and 49 by flip-flops 50 and 54 respectively. Flip-flops 50 and 54 function similarly to flip-flop 26 of FIG. 3. A high logic level signal presented to input 51 of flip-flop 50 or input 55 of flip-flop 54 will cause a high logic level signal to appear at output 53 or 57 respectively. The output signal of flip-flop 50 or 54 will then remain at the high logic state until a high logic level signal is presented to input 52 or input 56 of flip-flop 50 or flip-flop 54 respectively. When such a signal is received the output signal of the respective flip-flop will return to its low logic state. Such set and reset signals are generated by PLA 13 of FIG. 1 in response to the detection of predetermined actual address signals. When a first predetermined address signal is detected a signal is transmitted on bus 15 causing a system high voltage level signal to be applied to signal line 60 and hence to input region 51 of flip-flop 50. The detection of a second predetermined address signal will cause a system high voltage level signal to be transmitted on bus 15 to signal line 61 and input region 52 of flip-flop 50. Similarly the detection of predetermined address signals will cause system high voltage level signals to be transmitted to signal lines 62 and 63 and input regions 55 and 56 of flip-flop 54.

Output 53 of flip-flop 50 is electrically connected to input 48 of connecting means 47 by signal line 58. In the simplest embodiment connecting means 47 could simply be an electrical conductor. In the preferred embodiment, however, connecting means 47 operates as a thirteen bit ROM with each bit providing an output signal to one of signal lines 40A through 40F. When the input signal received at input 48 of connecting means 47 is at the system low voltage level all of the memory devices of connecting means 47 act as unselected memory cells. Therefore each of signal lines 40A through 40F receive a signal at the system low voltage level. When connecting means 47 receives a signal at the system high voltage level at input 48 all memory devices of connecting means 47 act as selected memory devices and each will provide an output to the associated one of signal lines 40A through 40F the value of which will be dependent on the value programmed into that memory cell during the manufacturing process.

Flip-flop 54 and connecting means 49 provide signals to signal lines 41A through 41F in a manner analogous to that in which signals are provided to signal lines 40A through 40F by connecting means 47 and flip-flop 50. As may be seen in FIG. 8 signal lines 40A and 41A are electrically connected to one another, and both are electrically connected to input region 45A of EXCLUSIVE OR gate 43A. If either or both of signal lines 40A and 41A receive a signal at the system high voltage level then such a signal will be received by input region 45A of EXCLUSIVE OR gate 43A. Under such circumstances the output signal from EXCLUSIVE OR gate 43A will be an inverted version of the input signal received at input region 44A, as explained above. Only if both signal lines 40A and 41A are at the system low voltage level will the signal presented at input region 44A of EXCLUSIVE OR gate 43A be passed through unchanged. Similarly if any of signal lines 40A through 40F or 41A through 41F receive a signal at the system high voltage level the associated one of input regions 45A through 45F of EXCLUSIVE OR gates 43A through 43F will receive a signal at the system high voltage level, causing, of course, the signal received at the associated one of input regions 44A through 44F to appear in inverted form at the associated one of output regions 46A through 46F.

Those skilled in the art will perceive various modifications which could be made in the above described address relocation system without significantly changing the invention. For example, only one flip-flop need be provided, although more than two could be provided. Not all of the bits of the incoming address signal need to pass through a EXCLUSIVE OR gate. Some of these signals could be passed directly through address relocation means 17. As long as the possibility of inverting at least one of the bits of the incoming address signal is provided the address relocation function is served. The ability to invert a plurality of the bits in various combinations simply enhances the level of security provided. Furthermore flip-flops 50 and 54 of FIG. 8 could be provided as a portion of PLA 13 of FIG. 1 rather than as a part of the address relocation circuit itself.

In another alternative embodiment one or more EXCLUSIVE OR gates having one input connected to a reference voltage source are provided. The second input of such EXCLUSIVE OR gates are electrically connected to connecting means such as connecting means 47 and 49 of FIG. 8 in a manner similar to that in which inputs 45A and 45F are connected to connecting means 47 and 49 of FIG. 8. The output regions of the EXCLUSIVE OR gate are electrically connected to an internal address bus as output regions 46A through 46F are electrically connected to bus 22 of FIG. 8. Thus such EXCLUSIVE OR gates do not require, or even receive, a signal from the incoming address bus, but do provide a signal to the internal address bus. The output signals from these gates may be switched between high and low logic levels by changing the signal level transmitted to them by the connecting means. Such EXCLUSIVE OR gates may be used to disguise the number of memory locations available in the SROM as discussed above.

Furthermore those skilled in the art will perceive that the address relocation circuit may be activated or reprogrammed in response to signals generated in a manner other than that described above. Any of the methods which could be used to generate signals to invoke the access deny circuit could also be used to generate signals to set or reset flip-flops 50 and 54 of FIG. 8. Also the use of the address relocation circuit is not limited to the intentional address relocation used to prevent access monitoring as described above. The address relocation circuit could be used as a scrambler, such as scrambler 335 of FIG. 6, to alter addresses after detection of an unacceptable sequence of incoming address signals.

The embodiments of the invention in which an exclusive property or right is claimed are defined as follows:

1. A secure read only memory comprising:
   an address input bus means;
   an internal address bus means;
   a data output bus means;
   a memory cell array means having a plurality of memory locations, each memory location having associated therewith a memory location address, said memory cell array means being adapted to accept an actual address signal from said internal address bus means and to transmit a data output signal to said data output bus means representative of data stored in a memory location having a memory location address corresponding to said actual address signal;
   a reprogrammable address relocation means adapted to:
   receive a signal from said address input bus means;
   execute instructions to reprogram said reprogrammable address relocation means;
   generate an actual address signal in response to an attempt to access data stored in one of said memory locations of said memory cell array means;

and transmit said actual address signal on said internal address bus means;

means for detecting unacceptable sequences of memory location accesses; and access deny means adapted to prevent said memory cell array means from returning a valid data output signal on said data output bus in response to attempts to access data stored in at least a portion of said memory locations of said memory cell array means, following detection of one of said unacceptable sequences.

2. The secure read only memory of claim 1 wherein said means for detecting unacceptable sequences of memory location accesses includes a programmable logic array.

3. The secure read only memory of claim 2 wherein said programmable logic array detects unacceptable sequences by detecting attempts to access memory locations in said memory cell array which are not accessed during normal program execution.

4. The secure read only memory of claim 2 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

5. The secure read only memory of claim 1 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

6. The secure read only memory of claim 5 wherein n is equal to eight.

7. The secure read only memory of claim 1 wherein said access deny means includes a plurality of storage register means, at least one of said storage register means comprising electrically alterable memory.

8. The secure read only memory of claim 7 wherein said means for detecting unacceptable sequences of memory location accesses includes a programmable logic array.

9. The secure read only memory of claim 8 wherein said programmable logic array detects unacceptable sequences by detecting attempts to access memory locations in said memory cell array which are not accessed during normal program execution.

10. The secure read only memory of claim 8 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

11. The secure read only memory of claim 7 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

12. The secure read only memory of claim 11 wherein n is equal to eight.

13. The secure read only memory of claim 7 wherein each of said storage register means is capable of storing m bits, where m is a positive integer and said access deny means includes fewer than $2^m$ of said storage register means.

14. The secure read only memory of claim 13 wherein said means for detecting unacceptable sequences of memory location accesses includes a programmable logic array.

15. The secure read only memory of claim 14 wherein said programmable logic array detects unacceptable sequences by detecting attempts to access memory locations in said memory cell array which are not accessed during normal program execution.

16. The secure read only memory of claim 14 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

17. The secure read only memory of claim 13 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

18. The secure read only memory of claim 17 wherein n is equal to eight.

19. The secure read only memory of claim 1 wherein said access deny means scrambles said data output signals prior to transmission on said data output bus means after said means for detecting unacceptable sequences has detected an unacceptable sequence.

20. The secure read only memory of claim 19 wherein said means for detecting unacceptable sequences of memory location accesses includes a programmable logic array.

21. The secure read only memory of claim 20 wherein said programmable logic array detects unacceptable sequences by detecting attempts to access memory locations in said memory cell array which are not accessed during normal program execution.

22. The secure read only memory of claim 20 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

23. The secure read only memory of claim 19 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

24. The secure read only memory of claim 23 wherein n is equal to eight.

25. The secure read only memory of claim 1 wherein said access deny means scrambles said actual address signal prior to transmission on said internal address bus means, after said means for detecting unacceptable sequences detects an unacceptable sequence.

26. The secure read only memory of claim 25 wherein said means for detecting unacceptable sequences of memory location accesses includes a programmable logic array.

27. The secure read only memory of claim 26 wherein said programmable logic array detects unacceptable sequences by detecting attempts to access memory locations in said memory cell array which are not accessed during normal program execution.

28. The secure read only memory of claim 26 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

29. The secure read only memory of claim 25 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

30. The secure read only memory of claim 29 wherein n is equal to eight.

31. A secure read only memory comprising:
an address input bus means including a plurality of single bit lines;
an internal address bus means including a plurality of single bit lines;
a data output bus means;
a memory cell array means having a plurality of memory locations, each memory location having associated therewith a memory location address, said memory cell array means being adapted to accept an actual address signal from said internal address bus means and to transmit a data output signal to said data output bus means representative of data stored in a memory location having a memory location address corresponding to said actual address signal;
means for detecting unacceptable sequences of memory location accesses;
reprogrammable address relocation means including:
an EXCLUSIVE OR gate means having first and second input means and an output means, said EXCLUSIVE OR gate means first input means being electrically connected to one of said address input bus means single bit lines and said EXCLUSIVE OR gate means output means being electrically connected to one of said internal address bus means single bit lines;
a flip-flop means having first and second input means and an output means said flip-flop means being adapted to provide a signal representative of a first logic state at said output means in response to a first signal provided at said flip-flop first input means, and to provide a signal representative of a second logic state at said output means in response to a second signal presented to said flip-flop means second input means; and
a connecting means having an input region and an output region, said connecting means input region being electrically connected to said flip-flop output region and said connecting means output region being electrically connected to said EXCLUSIVE OR gate means second input region; and
access deny means having a plurality of storage register means, at least one of said storage register means comprising electrically alterable memory, each of said storage register means being capable of storing m bits, where m is a positive integer and said access deny means includes fewer than $2^m$ of said storage register means, and said access deny means being adapted to:
execute instructions to store selected values in said storage register means if said instructions are received prior to detection of an unacceptable sequence of memory location accesses;
refuse to alter values stored in said storage register means after detection of an unacceptable sequence; and
substitute values stored in a selected storage register means for a portion of said actual address signal after detection of an unacceptable sequence of memory location accesses.

32. The secure read only memory of claim 31 wherein said means for detecting unacceptable sequences of memory location accesses includes a programmable logic array.

33. The secure read only memory of claim 32 wherein said programmable logic array detects unacceptable sequences by detecting attempts to access memory locations in said memory cell array which are not accessed during normal program execution.

34. The secure read only memory of claim 32 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

35. The secure read only memory of claim 31 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

36. The secure read only memory of claim 35 wherein n is equal to eight.

37. A secure read only memory comprising:
a data output bus means;
a memory cell array means organized into a plurality of memory locations, said memory cell array means being adapted to accept an address signal and to provide to said data output bus means data output signals representative of data stored in a memory location corresponding to said address signal;
means for detecting unacceptable sequences of memory address accesses; and
access deny means, adapted to prevent said memory cell array means from returning valid data on said data output bus means in response to attempts to access data stored in at least a portion of said memory locations of said memory cell array means, following detection of one of said unacceptable sequences.

38. The secure read only memory of claim 37 wherein said means for detecting unacceptable sequences of memory location accesses includes a programmable logic array.

39. The secure read only memory of claim 38 wherein said programmable logic array detects unacceptable sequences by detecting attempts to access memory locations in said memory cell array which are not accessed during normal program execution.

40. The secure read only memory of claim 38 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

41. The secure read only memory of claim 37 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

42. The secure read only memory of claim 41 wherein n is equal to eight.

43. The secure read only memory of claim 37 wherein said access deny means scrambles said incoming address signals prior to providing said incoming address signals to said memory cell array means, after said means for detecting unacceptable sequences has detected an unacceptable sequence.

44. The secure read only memory of claim 43 wherein said means for detecting unacceptable sequences of memory location accesses includes a programmable logic array.

45. The secure read only memory of claim 44 wherein said programmable logic array detects unacceptable sequences by detecting attempts to access memory locations in said memory cell array which are not accessed during normal program execution.

46. The secure read only memory of claim 44 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

47. The secure read memory of claim 43 wherein each of said memory locations includes n+1 memory cells, where n is a positive integer, each memory cell being adapted to store one bit, one of said n+1 bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

48. The secure read only memory of claim 47 wherein n is equal to eight.

49. The secure read only memory of claim 37 wherein said access deny means scrambles said data output signals prior to transmission on said data output bus means, after said means for detecting unacceptable sequences has detected an unacceptable sequence.

50. The secure read only memory of claim 49 wherein said means for detecting unacceptable sequences of memory location accesses includes a programmable logic array.

51. The secure read only memory of claim 50 wherein said programmable logic array detects unacceptable sequences by detecting attempts to access memory locations in said memory cell array which are not accessed during normal program execution.

52. The secure read only memory of claim 50 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

53. The secure read only memory of claim 49 wherein each of said memory locations includes $n+1$ memory cells, where n is a positive integer, each memory cell being adapted to store one bit, one of said $n+1$ bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

54. The secure read only memory of claim 53 wherein n is equal to eight.

55. The secure read only memory of claim 37 wherein said access deny means includes:
a plurality of storage register means each of said storage register means being capable of storing m bits, where m is a positive integer, said access deny means including fewer than $2^m$ of said storage register means;
multiplexer means adapted to combine a value stored in a selected one of said storage register means with said address signal after detection of one of said unacceptable sequences of memory location accesses.

56. The secure read only memory of claim 55 wherein said means for detecting unacceptable sequences of memory location accesses includes a programmable logic array.

57. The secure read only memory of claim 56 wherein said programmable logic array detects unacceptable sequences by detecting attempts to access memory locations in said memory cell array which are not accessed during normal program execution.

58. The secure read only memory of claim 56 wherein said programmable logic array detects accesses to memory locations containing unconditional branching instructions and accesses to memory locations which are destinations of unconditional branching instructions, an unacceptable sequence being identified if a destination location is not accessed immediately after an unconditional branching instruction.

59. The secure read only memory of claim 55 wherein each of said memory locations includes $n+1$ memory cells, where n is a positive integer, each memory cell being adapted to store one bit, one of said $n+1$ bits in each memory location being designated as an extra bit, said extra bit having a first binary value if its associated memory location is a final memory location of an unconditional branching instruction or a first memory location of a branching destination, and a second binary value in all other cases, an unacceptable sequence being identified if a first memory location having a first memory location extra bit equal to said first binary value is accessed and in an immediately following memory access a second memory location having a second memory location extra bit equal to said second binary value is accessed.

60. The secure read only memory of claim 59 wherein n is equal to eight.

61. The secure read only memory of claim 55 wherein m is equal to three and said access deny means includes four of said storage register means.

* * * * *